US008200278B2

(12) United States Patent
Little

(10) Patent No.: US 8,200,278 B2
(45) Date of Patent: Jun. 12, 2012

(54) ADDING SMS AS A TRANSPORT TYPE FOR AN ENTERPRISE SERVICE BUS

(75) Inventor: Mark Cameron Little, Ebchester (GB)

(73) Assignee: Red Hat, Inc., Raleigh, NC (US)

(*) Notice: Subject to any disclaimer, the term of this patent is extended or adjusted under 35 U.S.C. 154(b) by 593 days.

(21) Appl. No.: 12/350,905

(22) Filed: Jan. 8, 2009

(65) Prior Publication Data

US 2010/0173654 A1 Jul. 8, 2010

(51) Int. Cl.
*H04M 1/00* (2006.01)
*H04W 4/00* (2009.01)

(52) U.S. Cl. ..................... 455/556.1; 455/466

(58) Field of Classification Search .......... 370/466, 370/389, 463, 401, 469, 338, 392, 352; 710/106; 702/186; 455/466, 445, 404.2, 456.3, 412.2, 455/412.1, 418; 709/206, 237, 224, 223; 717/120, 101, 100

See application file for complete search history.

(56) References Cited

U.S. PATENT DOCUMENTS

| | | | | |
|---|---|---|---|---|
| 5,938,752 | A * | 8/1999 | Leung et al. | 710/106 |
| 7,912,956 | B1 * | 3/2011 | Williams et al. | 709/226 |
| 2003/0236918 | A1 * | 12/2003 | Manor et al. | 709/250 |
| 2005/0164721 | A1 * | 7/2005 | Eric Yeh et al. | 455/466 |
| 2006/0268926 | A1 * | 11/2006 | Zanaty | 370/463 |
| 2007/0165625 | A1 * | 7/2007 | Eisner et al. | 370/389 |
| 2009/0070456 | A1 * | 3/2009 | Brown et al. | 709/224 |
| 2010/0057403 | A1 * | 3/2010 | Vecera et al. | 702/186 |
| 2010/0099442 | A1 * | 4/2010 | Chin et al. | 455/466 |
| 2010/0150169 | A1 * | 6/2010 | Brown et al. | 370/466 |

OTHER PUBLICATIONS

JBOSS Enterprise SOA Platform, www.redhat.com/jboss, 2007, 5 pgs.
JBOSS ESB 4.4 GA, Getting Started With Jboss ESB, JBESB-GS-Aug. 5, 2008, 13 pgs.
JBOSS ESB, What is an ESB?, http://www.jboss.org/jbossesb/resources/WhatIsAnESB.html, Dec. 16, 2008, 2 pgs.
Short Message Service, http:www.webopedia.com/TERM/S/short_message_service.html, May 6, 2004, 4 pgs.
Enhanced Message Services, http://www.webopedia.com/TERM/E/Enhanced_Message_Service.html, Sep. 19, 2006, 4 pgs.
Multimedia Message Service, Oct. 11, 2006, http://www.webopedia.com/TERM/M/Multimedia_Message_Service.html <http://isp.webopedia.com/TERM/M/Multimedia_Message_Service.html>, 4 pgs.
JOBSS ESB 4.4 GPA, Services Guide, http://www.jboss.org/jbossesb/docs/4.4.GA/manuals/pdf/ServicesGuide.pdf,JBESB-SG-Aug. 5, 2008, 73 pages.
King, Erik, "Perpetual Enterprise Management Service (PEMS) for Next Generation SOA-based Command & Control Systems", Jun. 2005, 26 pages.
King, Erik, "Perpetual Enterprise Management Service (PEMS) for C2 SOA Deployments", Jun. 14, 2005, 23 pages.

* cited by examiner

*Primary Examiner* — Kiet Doan
(74) *Attorney, Agent, or Firm* — Lowenstein Sandler PC

(57) ABSTRACT

The enterprise service bus system communicates enterprise system bus messages across a cellular phone transport network. This system segments enterprise system bus messages into data segments according to the protocol used to transport the message. Furthermore, the system encapsulates each of the data segments and transmits the encapsulated data segments. In addition, the system receives the encapsulated data segments, decapsulates these segments and assembles the enterprise service bus message.

16 Claims, 7 Drawing Sheets

ADDING SMS AS A TRANSPORT TYPE FOR AN ENTERPRISE SERVICE BUS

TECHNICAL FIELD

Embodiments of the present invention relate to a method and system for network communications. Specifically, embodiments of the invention relate to communicating enterprise service bus messages using cellular phone communication protocols.

BACKGROUND

A service oriented architecture (SOA) enables enterprises to integrate services, handle business events, and automate business processes more efficiently. For example, an SOA links information technology resources, data, services, and applications. An SOA can include an enterprise service bus (ESB). An ESB is an event-driven and standards-based messaging engine that provides services for more complex architectures. The ESB provides infrastructure that links together service and clients to enable distributed applications and processes. For example, an ESB can include one or more busses that logically interconnect available services and clients.

The ESB interconnects service and clients using different protocols such as hypertext transfer protocol, common object request broker architecture, Java™, file transfer protocol, and email. These protocols typically run over an Ethernet network and are not available to cellular phones that do not include Ethernet services. Alternatively, it may expensive to use these Ethernet-based protocols on a cellular phone.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

The ESB communication system transmits and receives ESB messages using one or more of short message service (SMS), multimedia message service (MMS), enhanced message service (EMS) and/or Bluetooth™ protocols. A ESB communication system is a cellular phone, laptop, personal computer, server, and/or another device device configured to communicate ESB messages using one of the above protocols. Each ESB communication system includes plug-in modules for each of the SMS, MMS, EMS, and Bluetooth™ protocols to handle the transmission and receipt of ESB messages. Furthermore, the ESB communication system segments the ESB message for transmission according to the designated transport protocol and encapsulates each of the data segments for transmission.

In addition, the ESB communication system receives encapsulated data segments from another ESB communication system. The system decapsulates the received data segments and assembles the decapsulated data segments into an ESB message.

Figure 1:
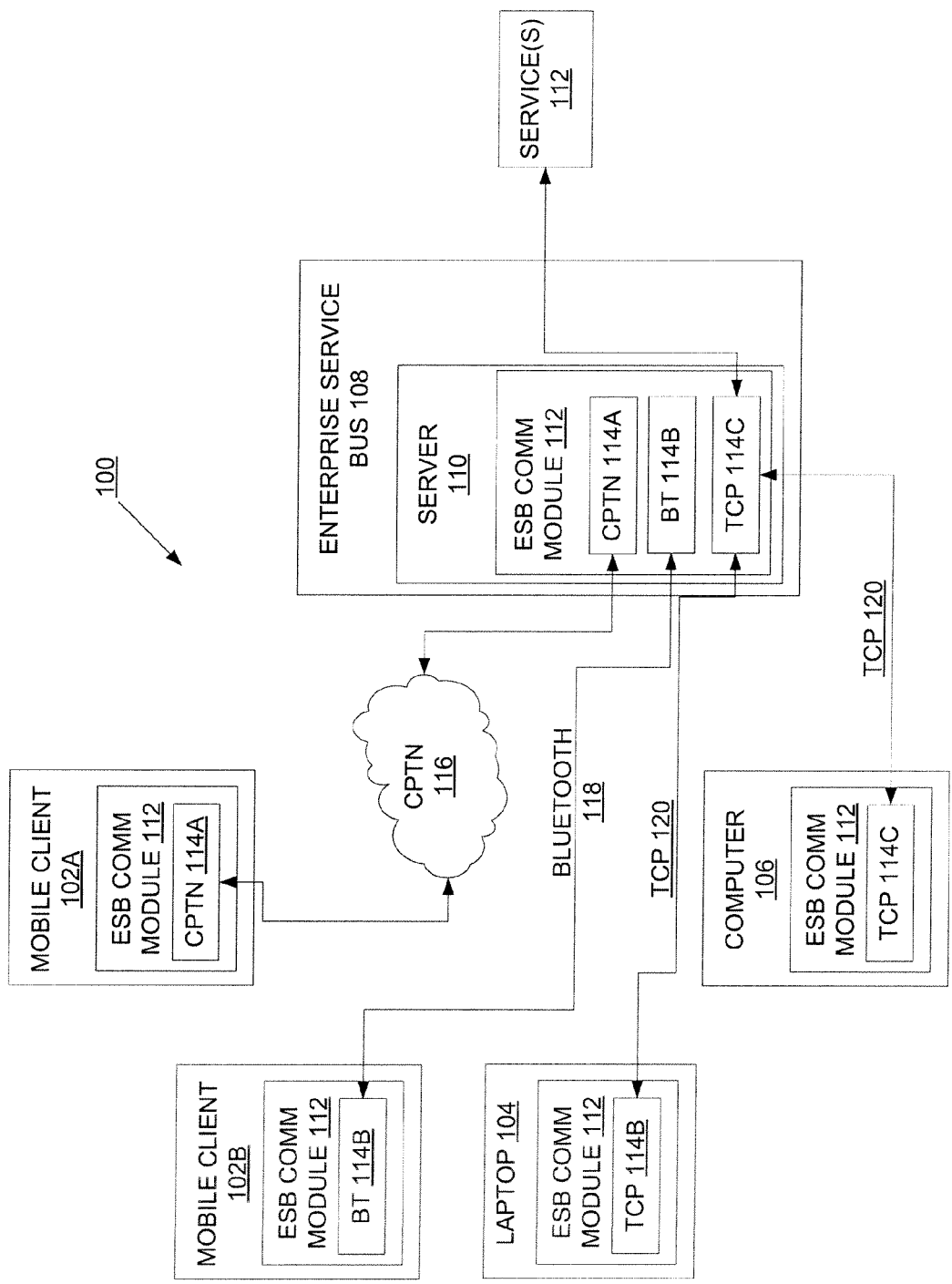
FIG. 1 is a block diagram of one embodiment of ESB system communicating ESB messages over a cellular phone transport network (CPTN).

FIG. 1 is a block diagram of one embodiment of SOA 100 communicating ESB messages using a CPTN. In one embodiment, CPTN is a network that allows mobile clients (e.g., cellular phones) to exchange these messages. In this embodiment, CPTN supports protocols such as SMS, MMS, EMS, BT, and/or any combination therewith Furthermore, other devices can exchange message over CPTN using the supported protocols. For example and in one embodiment, CPTN supports all four protocols. As another example, CPTN supports SMS, MMS, and EMS protocols. In this embodiment, Bluetooth™ support is through an ad hoc network created by two Bluetooth™ paired devices.

In FIG. 1, SOA 100 comprises ESB 108, mobile clients 102A-B, laptop 104, computer 106, and service(s) 112. Mobile clients 102A-B can be a cellular phone or any other mobile device configured to communicate using one of SMS, MMS, EMS, and/or Bluetooth™ protocols (music player, personal digital assistant, etc.) In one embodiment, mobile clients 102A-B, laptop 104, computer 106 are clients that make use of service(s) 112 using ESB 108. In this embodiment, mobile clients 102A-B, laptop 104, and computer 106 access service(s) 112 by communicating ESB messages to service(s) 112 via ESB 108 using one or more servers 110 that are part of ESB 108. In one embodiment, ESB messages are used to integrate services, handle business events, and automate business processes more efficiently.

Each of mobile clients 102A-B, laptop 104, and computer 106 communicate with server(s) 110 using ESB communication modules 112A-D, respectively. In one embodiment, ESB communication modules 112A-D receive ESB messages from other modules (not shown) that process the ESB messages. ESB communication modules 112A-D prepare these ESB messages for transmission. In one embodiment, ESB communication modules 112A-D each prepare the ESB message for one of the plug-in communication modules that ESB communication module is configured to use. In this embodiment, each ESB communication module comprises one or more of the different plug-in communication modules, where each plug-in communication module communicates the ESB message using a different network protocol. For example, ESB communication module 112A for mobile client 102A includes cellular phone telephone network plug-in communication modules that allows mobile client 106A to communicate ESB messages one of SMS, MMS, and EMS protocols over CPTN 116. Mobile client 102B includes ESB communication module 112B that uses Bluetooth™ plug-in communication module 114B to communicate ESB messages over a Bluetooth™ network 118. Laptop 104 and computer 106 each have an ESB communication module 112C-D, respectively that each include transmission control protocol (TCP) plug-in communication module 114C to communication ESB messages over a TCP network 120.

Sever(s) 110 each have ESB communication module 112E with the appropriate plug-in communication modules to communicate with mobile clients 102A-B, laptop 104, computer 106, and services 112. In one embodiment, ESB communication module 112E comprises CPTN plug-in module 114A, Bluetooth™ plug-in module 114B, and TCP plug-in module 114C. Server(s) 110 communicates with mobile client 114A with CPTN plug-in module 114A, mobile client 114B with Bluetooth™ plug-in module 114B, and laptop 104, computer 106, and service(s) 112 with TCP plug-in module 114C.

Figure 2:
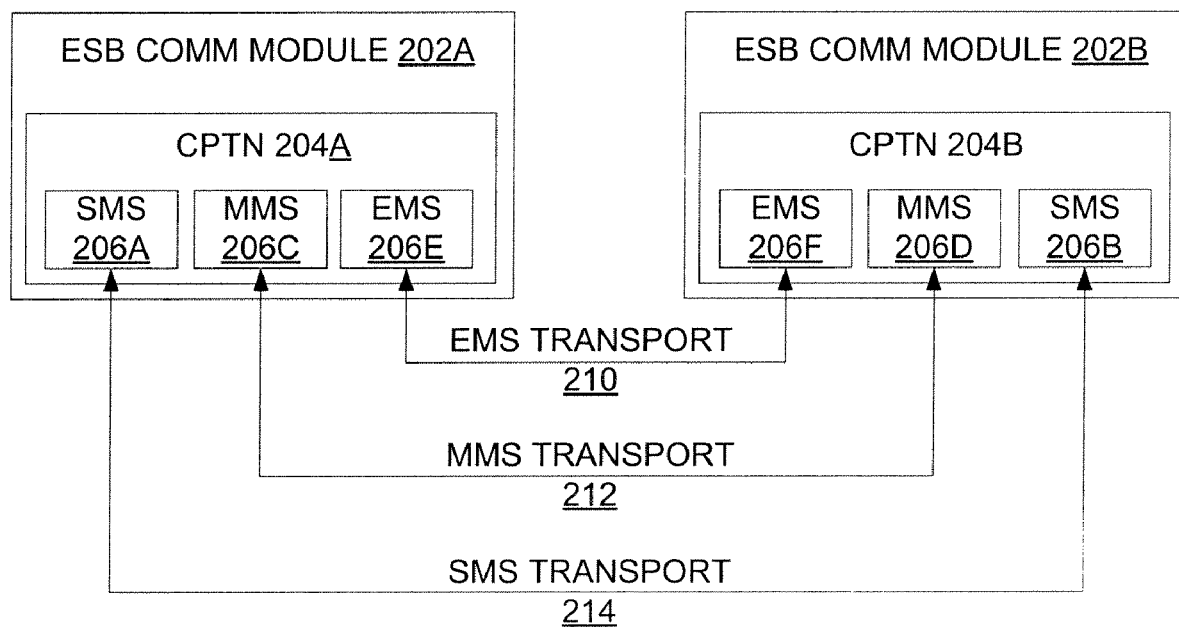
FIG. 2 is a block diagram of one embodiment of an ESB communication module.

As mention above, CPTN plug-in module 114A communicates ESB messages over CPTN 116 using protocols associated with this network. In one embodiment, CPTN plug-in module 114A using SMS, MMS, and EMS protocols. FIG. 2 is a block diagram of one embodiment of ESB communication modules communicating with each other using CPTN protocols. In FIG. 2, ESB communication module 202A-B comprise CPTN plug-in module 204A-B, respectively. Each CPTN plug-in module 204A-B comprises SMS communication module 206A-B, MMS communication module 206C-D, and EMS communication module 206E-F.

SMS is a communications protocol that allows the interchange of short text messages between mobile clients using a Global System for Mobile (GSM) and/or Code Division Multiple Access (CDMA) cellular telephone network. In these networks, an SMS client (e.g., mobile client 106A) transmits the SMS messages to a short message service center which provides a store-and-forward mechanism. The short message service center forwards the SMS message to the recipient. While in one embodiment, SMS is used between two different mobile clients, in alternate embodiments, SMS is used between clients and/or servers that can be non-mobile. As is known in the art, SMS sends messages between clients that are typically limited to 160 bytes. Furthermore, SMS messages delivery is best effort and can be unreliable, meaning that SMS message delivery can be delayed or the SMS message can be lost.

In an alternate embodiment, SMS can be used between a mobile client and a computer, where the computer transmits and receives SMS message embedded in emails. In this embodiment, short message service center embeds an SMS message coming from a mobile client into an email message. The short message center forwards this email to the designated email recipient. In the opposite direction, short message service center receives an email containing an SMS message. Short message service center extracts the the SMS message from the email and forwards this SMS message to the designated recipient.

MMS is a extension of SMS that allows clients to send and/or receive larger messages than SMS and the messages can include multimedia objects. The upper limit on MMS message size is larger than SMS, but MMS messages are typically limited to 300 kb. EMS is another extension to SMS that allows special text formatting, animations, pictures, icons, sound effects and special ring tones in the text message.

Bluetooth™ is a short distance wireless protocol for exchanging data over short distances between mobile and non-mobiles devices. Two Bluetooth™ enabled devices use a point to point communication by establishing a trusted relationship. In one embodiment, two Bluetooth™ enabled devices exchange binary objects using the ObjectExchange (OBEX) protocol. OBEX is a protocol that allows a device to establish a reliable transport to connect to another device and request objects (messages, files, etc.). In an alternate embodiment, the two Bluetooth™ enabled devices exchange messages using another protocol running over Bluetooth™ (Point-to-Point protocol, TCP/Internet protocol (TCP/IP), user datagram protocol (UDP), and Wireless Application Environment/Wireless Application Protocol (WAE/WAP).

Figure 3:
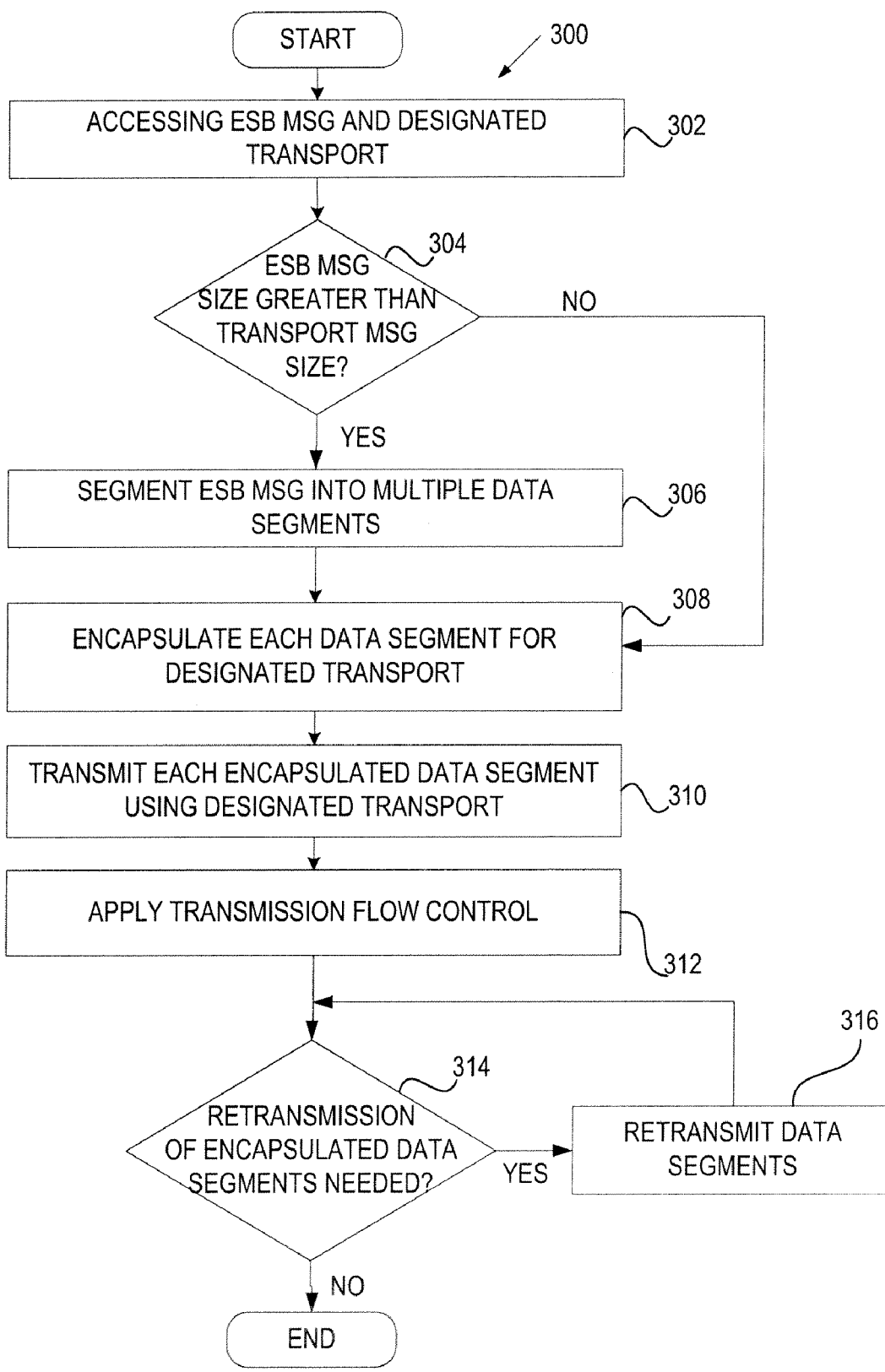
FIG. 3 is a flowchart of one embodiment of a process for transmitting an ESB message over a CPTN.

FIG. 3 is a flowchart of one embodiment of a process 300 for transmitting an ESB message over a CPTN. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by an ESB communication module used in a client and/or server such as ESB communication modules 114A,B, and E of FIG. 1.

Referring to FIG. 3, process 300 begins with processing logic accessing an ESB messages and the designated transport that will be used to transport this ESB message at block 302. In one embodiment, process 300 uses one of SMS, MMS, EMS, and Bluetooth™ to transport the ESB message.

At block 304, process 300 determines if the ESB message is greater than the designated transport size. For example and in one embodiment, if SMS is the designated transport, process 300 determines if the size of the ESB message plus a header size is greater than 160 bytes (maximum SMS message size). If the ESB message is greater than the designated transport message size, process 300 segments ESB message into multiple data segments at block 306. In one embodiment, process 300 segments the ESB message according to the size of a header that will be used for each data segment. The header used for the data segments is described further below. Execution proceeds to block 308. If the ESB message is less than the designated transport message size, process 300 uses the ESB message as a single data segment for encapsulation at block 308 below. Execution proceeds to block 308.

Process 300 encapsulates each of the one or more data segments into a message appropriate for the designated transport (SMS, MMS, EMS, Bluetooth™, etc.). In one embodiment, process 300 adds a header for each data segment. This header is used by a receiving process to decapsulate the ESB message data contained in the one or more encapsulated data segments. In one embodiment, the header for each of the data segments includes an ESB message identification, size of the ESB data stored in the data segment, the data segment identification, and end of ESB message indicator.

At block 310, process 300 transmits each encapsulated data segment using the designated transport. For example and in one embodiment, process 300 transmits the encapsulated data segments using one of SMS, MMS, EMS and Bluetooth™. Alternatively, process 300 embeds the encapsulated data segments in an SMS, MMS, or EMS message in an email and sends the email.

Process 300 applies transmit flow control to the transmitted encapsulated data segments in order to determine if the receiving device received the transmitted encapsulated data segments at block 312. In one embodiment, process 300 applies transmit flow control after the encapsulated data segments for that one ESB message have been transmitted. In another embodiment, process 300 applies transmit flow control after some, but not all, of the encapsulated data segments for that ESB message have been transmitted. In another embodiment, process 300 applies transmit flow control for encapsulated segments for more than one ESB message.

In one embodiment, process 300 applies the sliding window protocol transmit flow control. Sliding window protocol is used to keep a record of the encapsulated data segments sent and their respective acknowledgments received by both the users. Sliding window protocol is a variable duration window that allows process 300 to transmit a specified number of data segments before an acknowledgment is received or a specified events occurs. For example, if process 300 fails to receive an acknowledgment for the first transmitted data segment, process 300 resets the window and transmits a second data segment. In this embodiment, this process is repeated for a specified number of times before process 300 interrupts transmission.

Process 300 determines if one of the transmitted encapsulated data segments need to be re-transmitted at block 314. In one embodiment, process 300 determines that an encapsulated data segments needs to be retransmitted by failing to receive an acknowledgment from the receiving device (e.g., sever(s) 112, mobile client 104A, etc.). In alternate embodiment, a request to re-transmit an encapsulate data segment can occur if this data segment is lost or delayed. The receiving device signals to the transmitting device that one or more of the encapsulated data segments for a particular ESB message have not received within an allocated period. If a request to re-transmit is received, process 300 re-transmits the requested encapsulated data segments at block 316. Execution proceeds to block 314. If there is no requests for re-transmission of encapsulated data segments, process 300 ends.

Figure 4:
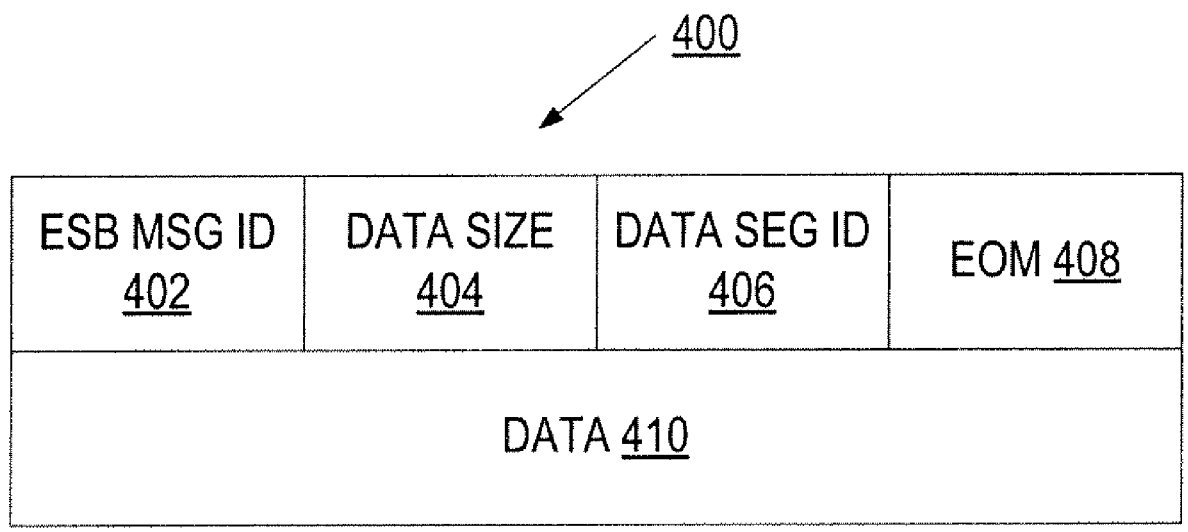
FIG. 4 is a block diagram of one embodiment of an encapsulated data segment.

As mentioned above, process 300 encapsulates each data segment of the ESB message for transmission using one of SMS, MMS, EMS, and Bluetooth™ protocols. FIG. 4 is a block diagram of one embodiment of an encapsulated data segment 400. In FIG. 4, encapsulated data segment 400 comprises ESB message identification field 402, data size field 404, data segment identification field 406, end of ESB message field 408, and data 410. In one embodiment, ESB message identification 402 is an identifier that is unique identification number set by the device transmitting the ESB message. Data size field 404 indicates the size of the data stored in the data segment. Data segment identification field 406 identifies which data segment of the ESB message corresponds to the data stored in data 410. In one embodiment, data segment identification field 406 has a value of zero (first data segment) or greater. End of ESB message field 408 indicates whether the data segment is the last data segment. In one embodiment, end of ESB message field 408 is a one bit field with zero meaning the data segment is not the last data segment and one meaning the data segment is the last data segment. Data 410 stores the ESB message data for this particular data segment.

Figure 5:
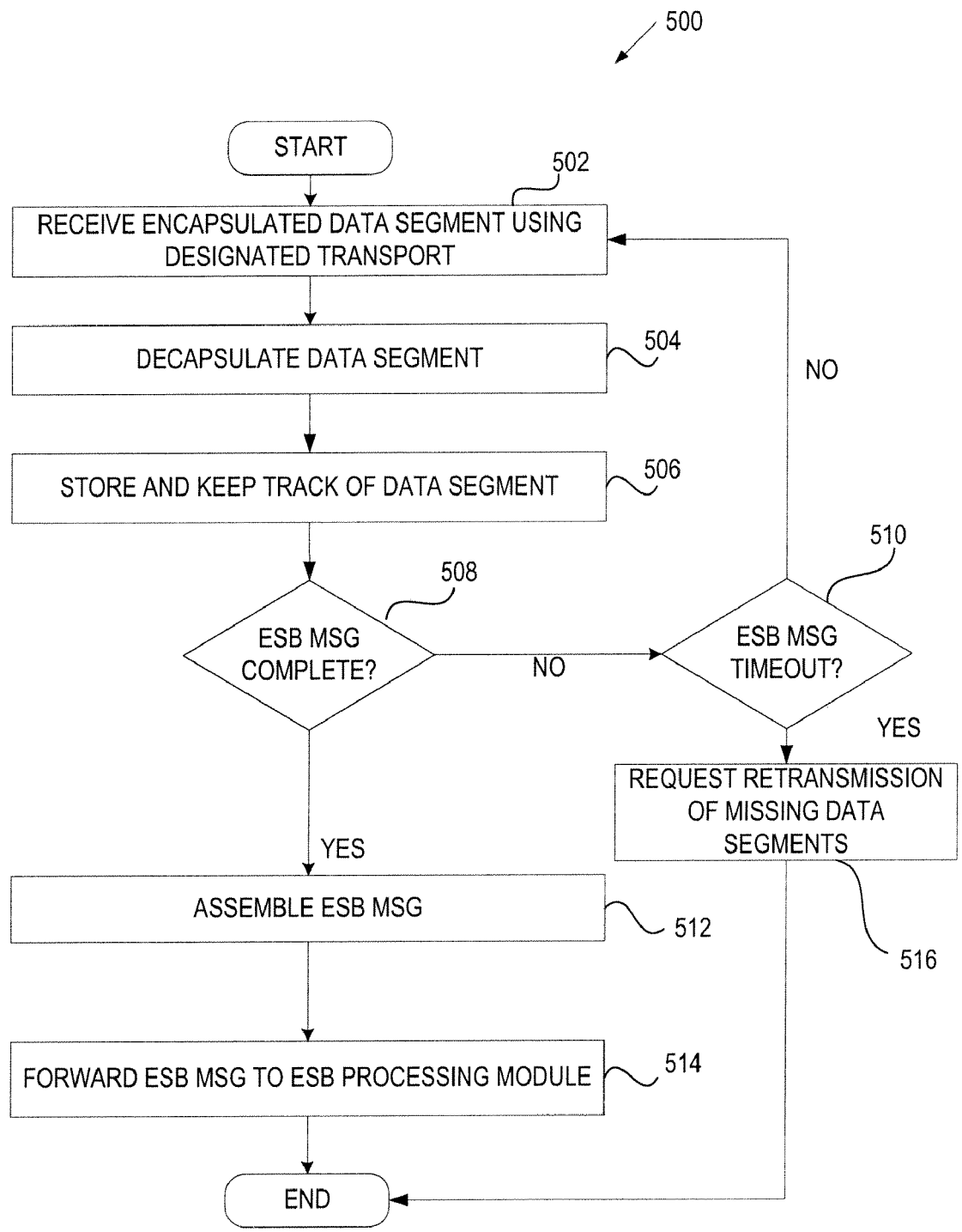
FIG. 5 is a flowchart of one embodiment of a process for receiving an ESB message over a CPTN.

FIG. 5 is a flowchart of one embodiment of a process 500 for receiving an ESB message over a CPTN. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 500 is performed by an ESB communication module used in a client and/or server, such as ESB communication modules 114A,B, and E of FIG. 1.

Referring to FIG. 5, process 500 begins with processing logic receiving an encapsulated data segment using one of the CPTN protocols (SMS, MMS, EMS, or Bluetooth™) at block 502. In addition, process 500 sends an acknowledgment to the transmitting device (e.g., sever(s) 112, mobile client 104A, etc.) that the encapsulated data segment has been received.

At block 504, process 500 decapsulates the data segment. In one embodiment, process 500 reads the header of the encapsulated data segment to retrieve the ESB message identification, data size, data identifier, and end of ESB message indicator. In addition, process 500 reads the data from the encapsulated data segment.

At block 506, process 500 stores the data from the decapsulated data segment and keeps track of the data segments. In one embodiment, process 500 stores the data in a buffer. In addition, process 500 keeps track of which data segments are needed for the ESB message identified in the data segment.

Using the information from the decapsulated data segment, process 500 determines if the ESB message identified in the decapsulated data segment is complete at block 508. If the ESB message is complete, process 500 assembles the ESB message using the one or more stored data segments. At block 514, process 500 forwards the assembled ESB message to the ESB messaging process module to process the received ESB message.

If process 500 determines that ESB message is not complete, process 500 sends a message to the transmitting device to re-transmit the missing encapsulated data segments at block 516.

Figure 6:
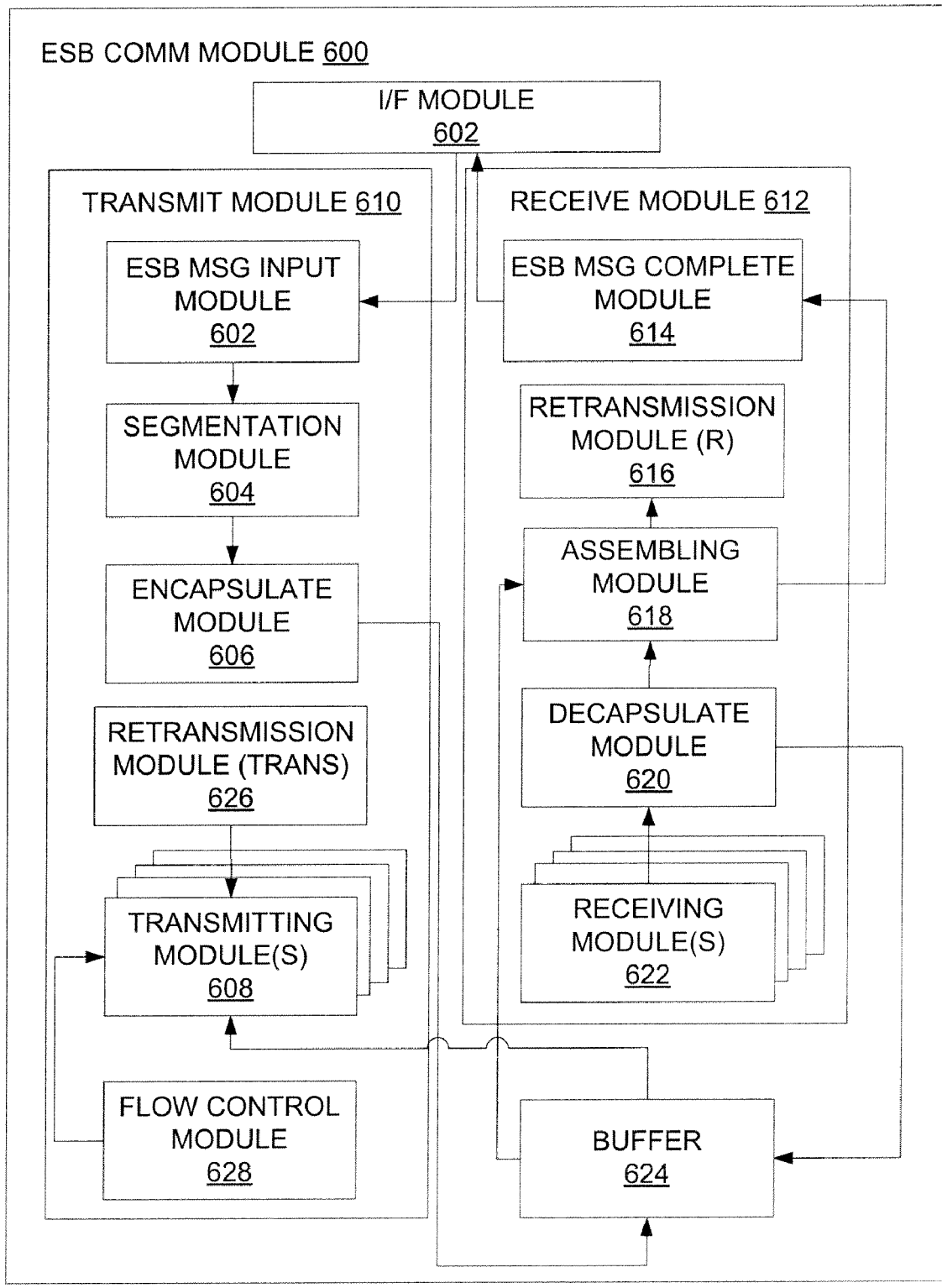
FIG. 6 is a block diagram of an ESB communication module that transmits and/or receives an ESB message using a CPTN.

FIG. 6 is a block diagram of an ESB communication module 600 that transmits and/or receives an ESB message using a CPTN. In one embodiment, ESB communication module 600 is ESB communication module 114A-E that is used by mobile clients 102A-B, laptop 104, computer 106, server(s) 110 to communicate ESB messages back and forth. In FIG. 6, ESB communication module 600 comprise interface module 602, transmit module 610, receive module 612, and buffer 624. Interface module 602 receives and forwards ESB messages with modules (not shown) that process the ESB messages.

Transmit module 610 transmits ESB messages as described in FIG. 3 and comprises ESB message input module 602, segmentation module 604, encapsulate module 606, retransmission module (T) 626, flow control module 628, and one or more transmitting module(s) 608. ESB message input module 602 receives the ESB message and designated transport as described in FIG. 3, block 302. Segmentation module 604 determines if an ESB message requires segmentation and segments that message into one or more data segments as described in FIG. 3, blocks 304 and 306. Encapsulate module 606 encapsulate the data segments as described in FIG. 3, block 308. Transmitting module(s) 608 transmits the encapsulated data segments as described in FIG. 3, block 310. In one embodiment, transmitting module(s) 608 are one or more modules that transmit different protocols (SMS, MMS, EMS, and Bluetooth™). Transmit module 608 uses buffer 624 to store encapsulated data segments and to retrieve the encapsulated data segments for transmission. In one embodiment, buffer 624 includes memory. Retransmission module (T) 626 re-transmitted encapsulated data segments as described in FIG. 3, blocks 314 and 316. Flow control module 628 applies flow control to the transmitted data segments as in FIG. 3, block 312.

Receive module 612 comprises ESB message compete module 614, retransmission module (R) 616, assembling module 618, decapsulate module 620, and receiving module(s) 622. ESB message complete module 614 determines if the ESB message is complete as described in FIG. 5, block 508. Retransmission module (R) 616 determines if data segments of the ESB message requires retransmission and requests retransmission as described in FIG. 5, blocks 510 and 516. Assembling module 618 assembles a complete ESB message as described in FIG. 5, block 512. Decapsulate module 620 decapsulates encapsulated data segments as described in FIG. 5, block 504. In one embodiment, decapsulate module 620 stores the decapsulated data segments in buffer 624. Receiving module(s) receives the encapsulated data segments as described in FIG. 5, block 502. In one embodiment, receiving module(s) 622 are one or more modules that receive encapsulated data segments according different protocols (SMS, MMS, EMS, and Bluetooth™).

Figure 7:
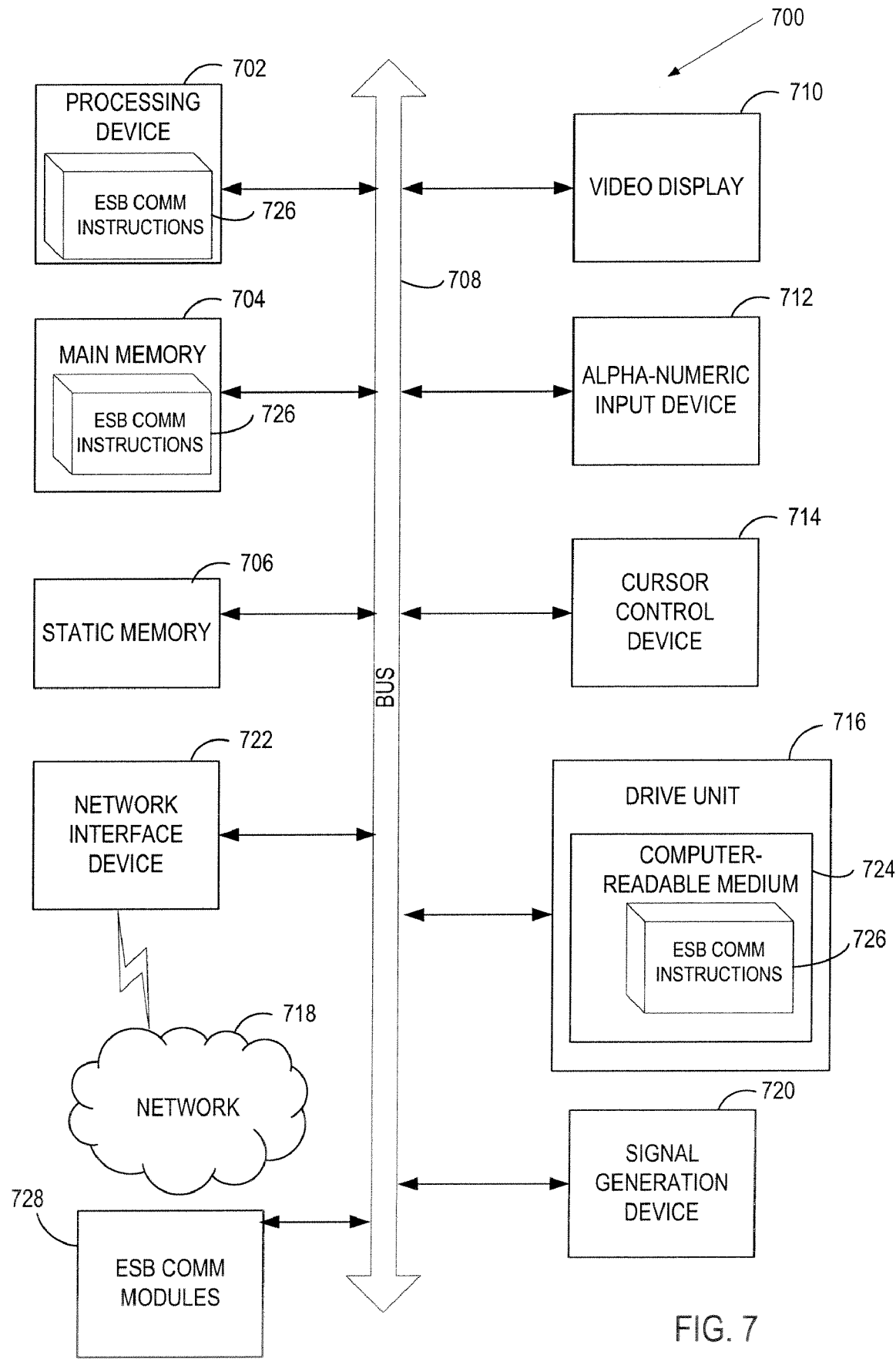
FIG. 7 is a diagram of one embodiment of a computer system for communicating ESB messages over a CPTN.

FIG. 7 is a diagram of one embodiment of device 700 for communicating ESB messages over an CPTN using one or more of SMS, MMS, EMS, and/or Bluetooth™ protocols. Within the device 700 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer transmitting and/or receiving ESB messages and the server computer receiving and/or transmitting ESB messages) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary device 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory 716 (e.g., a data storage device in the form of a drive unit, which may include fixed or removable computer-readable storage medium), which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the ESB communication system 726 for performing the operations and steps discussed herein.

The device 700 may further include a network interface device 722. The device 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., the ESB communication system 726) embodying any one or more of the methodologies or functions described herein. The ESB communication system 726 may also reside, completely or at least partially, within the main memory 704 and/or within the processing device 702 during execution thereof by the device 700, the main memory 704 and the processing device 702 also constituting machine-readable storage media. The ESB communication system 726 may further be transmitted or received over a network 718 via the network interface device 722.

The computer-readable storage medium 724 may also be used to store the ESB communication system 726 persistently. While the computer-readable storage medium 726 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 728, components and other features described herein (for example in relation to FIG. 1) can be implemented as discrete hardware components or integrated in the functionality of hardware components such as ASICS, FPGAs, DSPs or similar devices. In addition, the modules 728 can be implemented as firmware or functional circuitry within hardware devices. Further, the modules 728 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "segmenting," "re-transmitting," "encapsulating," "decapsulating," "creating," "retrieving," "storing," "transmitting," "assembling," "requesting," "accessing," "forwarding," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for communicating ESB messages been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
   wirelessly coupling a device to a cellular phone transport network; and
   communicating a first enterprise service bus message over the cellular phone transport network by at least one of the device coupled to the cellular phone transport network or a server computing device, wherein the communicating comprises:
      segmenting the first enterprise service bus message into a first plurality of data segments;
      encapsulating the first plurality of data segments into a first plurality of additional messages according to a cellular phone transport protocol, wherein the cellular phone transport protocol is one of short message service, extended message service, multimedia message service, and Bluetooth;
      transmitting the first plurality of additional messages encapsulating the first plurality of data segments via the cellular phone transport network using the cellular phone transport protocol;
      receiving, over the cellular phone transport network, a second plurality of additional messages encapsulating a second plurality of data segments that comprise a second enterprise service bus message;
      decapsulating the second plurality of data segments; and
      assembling the second enterprise service bus message from the decapsulated second plurality of data segments.

2. The method of claim 1, wherein the device is one of a cellular phone, mobile device, computer, and enterprise service bus server.

3. The method of claim 1, wherein a number of data segments included in one of the first or second plurality of data segments is based on a data payload of the cellular phone transport protocol.

4. The method of claim 1, wherein encapsulating the first plurality of data segments further comprises, for each data segment:
   receiving data for that data segment;
   creating a header for that data segment; and
   generating an additional message that includes the header and the data for that data segment.

5. The method of claim 4, wherein the header comprises an enterprise service bus message identification, a data size, an end of enterprise service bus message indicator, and a current data segment identification.

6. The method of claim 1, wherein the communicating further comprises:
   receiving an indication from another device requesting one or more of the transmitted first plurality of additional messages to be re-transmitted; and
   re-transmitting the requested one or more transmitted first plurality of additional messages.

7. The method of claim 1, wherein the communicating further comprises:
   determining that the first plurality of additional messages encapsulating the first plurality of data segments for the first enterprise service bus message needs to be re-transmitted; and
   requesting re-transmission of the first plurality of encapsulated data segments.

8. The method of claim 1, wherein the communicating further comprises:
   forwarding the assembled first enterprise service bus message to an enterprise service bus message processing module.

9. The method of claim 1, wherein the second enterprise service bus message is a response to the first enterprise service bus message.

10. A non-transitory computer-readable storage medium having instructions stored thereon that, when executed by a processing system, cause the processing system to perform a method comprising:
   wireles sly coupling a device to a cellular phone transport network; and
   communicating a first enterprise service bus message over the cellular phone transport network with the device coupled to the cellular phone transport network, wherein the communicating comprises:
      segmenting the first enterprise service bus message into a first plurality of data segments;
      encapsulating the first plurality of data segments into a first plurality of additional messages according to a cellular phone transport protocol, wherein the cellular phone transport protocol is one of short message service, extended message service, multimedia message service, and Bluetooth;
      transmitting the first plurality of additional messages encapsulating the first plurality of data segments via the cellular phone transport network using the cellular phone transport protocol;

receiving, over the cellular phone transport network, a second plurality of additional messages encapsulating a second plurality of data segments that comprise a second enterprise service bus message;

decapsulating the second plurality of data segments; and assembling the second enterprise service bus message from the decapsulated second plurality of data segments.

11. The non-transitory computer-readable medium of claim 10, wherein the method for encapsulating the first plurality of data segments further comprises, for each data segment:

receiving data for that data segment;

creating a header for that data segment; and generating an additional message that includes the header and the data for that data segment.

12. The non-transitory computer-readable medium of claim 10, wherein the method for communicating further comprises:

receiving an indication from another device requesting one or more of the transmitted first plurality of additional messages to be re-transmitted; and re-transmitting the requested one or more transmitted first plurality of additional messages.

13. The non-transitory computer-readable medium of claim 12, wherein the method for communicating further comprises:

determining that the first plurality of additional message encapsulating the first plurality of data segments for the first enterprise service bus message needs to be re-transmitted; and requesting re-transmission of the first plurality of encapsulated data segments.

14. The non-transitory computer-readable medium of claim 10, wherein the second enterprise service bus message is a response to the first enterprise service bus message.

15. A system comprising:

a communication module to communicate a first enterprise service bus message and a second enterprise service bus message over a cellular phone transport network with a device wirelessly coupled to the cellular phone transport network, wherein the communication module comprises:

a segmentation module to segment the first enterprise service bus message into a first plurality of data segments;

an encapsulating module to encapsulate the first plurality of data segments into a first plurality of additional messages according to a cellular phone transport protocol, wherein the cellular phone transport protocol is one of short message service, extended message service, multimedia message service, and Bluetooth;

a transportation module to transmit the first plurality of additional messages encapsulating the first plurality of data segments via the cellular phone transport network using the cellular phone transport protocol;

a receiving module to receive a second plurality of additional messages encapsulating a second plurality of data segments that comprise the second enterprise service bus message;

a decapsulation module, coupled to the receiving module, to decapsulate the second plurality of data segments; and an assembling module, coupled to the decapsulation module, to assemble the second enterprise service bus message from the decapsulated second plurality of data segments; and a buffer to store at least part of the enterprise service bus message, the buffer including memory.

16. The system of claim 15, wherein the second enterprise service bus message is a response to the first enterprise service bus message.

* * * * *